(12) United States Patent
Buil et al.

(10) Patent No.: US 10,719,812 B2
(45) Date of Patent: Jul. 21, 2020

(54) METHOD OF NOTIFYING A USER ON A TASK OF AN APPARATUS

(71) Applicant: KONINKLIJKE PHILIPS N.V., Eindhoven (NL)

(72) Inventors: Vincentius Paulus Buil, Gennep (NL); Bartel Marinus Van De Sluis, Eindhoven (NL); Lucas Jacobus Franciscus Geurts, Best (NL); Marco Van Leeuwen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 696 days.

(21) Appl. No.: 15/030,902

(22) PCT Filed: Oct. 27, 2014

(86) PCT No.: PCT/EP2014/072930
§ 371 (c)(1),
(2) Date: Apr. 21, 2016

(87) PCT Pub. No.: WO2015/063000
PCT Pub. Date: May 7, 2015

(65) Prior Publication Data
US 2016/0275459 A1    Sep. 22, 2016

(30) Foreign Application Priority Data

Nov. 4, 2013    (EP) .................................... 13191376

(51) Int. Cl.
*G06Q 10/00*    (2012.01)
*G06Q 10/10*    (2012.01)
(Continued)

(52) U.S. Cl.
CPC ....... *G06Q 10/1097* (2013.01); *H04B 13/005* (2013.01); *H04L 12/282* (2013.01);
(Continued)

(58) Field of Classification Search
None
See application file for complete search history.

(56) References Cited

U.S. PATENT DOCUMENTS 5,544,321 A    8/1996  Theimer et al.
6,865,685 B2 *  3/2005  Hammond .......... H02J 13/0086
                                                       700/22
(Continued)

FOREIGN PATENT DOCUMENTS

EP    2555474 A2    2/2013
JP    2006018623 A  1/2006
(Continued)

OTHER PUBLICATIONS

A Ferscha, M Hechinger, R Mayrhofer (Digital Aura, Institute for Pervasive Computing, University of Linz, Altenberger Stage 69, A-4040 Linz, Austria; Siemens AG, CT SE 2, Otto-Hahn Ring 6, D-81730 Munich, Germany, 2004). (Year: 2004).*

(Continued)

*Primary Examiner* — Hafiz A Kassim

(57) ABSTRACT

A notifying system for notifying a user is provided. The system comprises an apparatus (1; 21) arranged to perform a task. The apparatus may for example be a kitchen appliance such as an oven, where its task is heating food. The apparatus may also be a ticket machine of a public transport service. The system further comprises a mobile notifying device (2; 22; 40) for notifying the user about a task of the apparatus. The apparatus may be arranged to automatically detect the mobile notifying device if the mobile notifying device is in the vicinity of the apparatus once the task is initiated by a user, and to associate the task with the mobile notifying device. The apparatus and notifying device are arranged to communicate a notification message via a wireless communication network. This notification message comprises information related to the task, such as a message (Continued)

telling the user that the food is cooked. By automatically detecting the mobile notifying device, the apparatus is able to send a message to a person which has (most probably) initiated the task.

19 Claims, 4 Drawing Sheets

(51) Int. Cl.
   *H04L 12/28* (2006.01)
   *H04W 4/80* (2018.01)
   *H04B 13/00* (2006.01)

(52) U.S. Cl.
   CPC .......... *H04L 12/2829* (2013.01); *H04W 4/80* (2018.02); *H04L 2012/2841* (2013.01)

(56) References Cited

U.S. PATENT DOCUMENTS

| | | | | |
|---|---|---|---|---|
| 7,996,514 | B2* | 8/2011 | Baumert | G06F 21/35 709/203 |
| 8,335,795 | B2* | 12/2012 | Zhou | H04L 12/2827 707/769 |
| 8,544,064 | B2* | 9/2013 | Douillet | H04L 63/06 726/3 |
| 8,565,903 | B2* | 10/2013 | Koch | H04L 41/5012 700/17 |
| 8,718,826 | B2* | 5/2014 | Ramachandran | G05D 23/1905 700/278 |
| 8,879,524 | B2* | 11/2014 | Fasbender | H04L 12/2809 370/338 |
| 9,098,357 | B2* | 8/2015 | Uola | G06F 9/542 |
| 9,490,989 | B2* | 11/2016 | Park | H04L 12/12 |
| 9,634,899 | B2* | 4/2017 | Nakano | G06F 13/385 |
| 9,635,433 | B2* | 4/2017 | Bakar | H04N 21/6371 |
| 2001/0048373 | A1* | 12/2001 | Sandelnnan | H04L 29/12254 340/9.1 |
| 2002/0095454 | A1* | 7/2002 | Reed | G06Q 30/0601 709/201 |
| 2003/0100962 | A1* | 5/2003 | Sumita | H04L 12/2803 700/65 |
| 2003/0231602 | A1* | 12/2003 | Slemmer | H04L 12/2805 370/282 |
| 2004/0158333 | A1* | 8/2004 | Ha | H04B 3/542 700/3 |
| 2004/0260407 | A1* | 12/2004 | Wimsatt | G05B 15/02 700/19 |
| 2005/0015624 | A1* | 1/2005 | Ginter | G06F 21/55 726/4 |
| 2005/0071879 | A1* | 3/2005 | Haldavnekar | A61B 5/0062 725/81 |
| 2005/0096753 | A1* | 5/2005 | Arling | G05B 15/02 700/11 |
| 2005/0198063 | A1* | 9/2005 | Thomas | G05B 15/02 |
| 2005/0250444 | A1* | 11/2005 | Zinn | H04M 1/7253 455/41.2 |
| 2006/0242154 | A1* | 10/2006 | Rawat | G06F 17/30126 |
| 2007/0112939 | A1* | 5/2007 | Wilson | H04L 12/282 709/219 |
| 2007/0168486 | A1* | 7/2007 | McCoy | H04L 12/66 709/223 |
| 2008/0103610 | A1* | 5/2008 | Ebrom | G06F 9/54 700/29 |
| 2008/0136581 | A1* | 6/2008 | Heilman | G06F 9/54 340/3.1 |
| 2008/0297363 | A1 | 12/2008 | Fukushige et al. | |
| 2009/0044137 | A1* | 2/2009 | Bartley | G06F 9/54 715/764 |
| 2009/0046715 | A1* | 2/2009 | McCoy | G06F 9/54 370/389 |
| 2009/0189769 | A1* | 7/2009 | Schaffler | G06K 7/0008 340/572.7 |
| 2009/0210932 | A1* | 8/2009 | Balakrishnan | H04W 4/02 726/5 |
| 2009/0311961 | A1* | 12/2009 | Banerjea | H04W 52/50 455/41.2 |
| 2010/0138007 | A1* | 6/2010 | Clark | H04L 12/2809 700/90 |
| 2010/0262467 | A1* | 10/2010 | Barnhill, Jr. | H04L 12/2809 709/223 |
| 2011/0165896 | A1* | 7/2011 | Stromberg | G06Q 20/32 455/466 |
| 2011/0171937 | A1 | 7/2011 | Hill et al. | |
| 2011/0187928 | A1* | 8/2011 | Crabtree | G05B 23/02 348/553 |
| 2011/0251807 | A1* | 10/2011 | Rada | G01D 4/00 702/61 |
| 2011/0270453 | A1* | 11/2011 | Kalogridis | H02J 3/14 700/291 |
| 2012/0079092 | A1* | 3/2012 | Woxblom | H04L 47/20 709/223 |
| 2012/0084348 | A1* | 4/2012 | Lee | G06Q 30/02 709/203 |
| 2012/0093141 | A1* | 4/2012 | Imes | F24F 11/63 370/338 |
| 2012/0115542 | A1* | 5/2012 | Griffin | H04W 8/205 455/552.1 |
| 2012/0184209 | A1* | 7/2012 | Wengrovitz | H04L 67/125 455/41.2 |
| 2012/0215725 | A1* | 8/2012 | Imes | F24F 11/63 705/412 |
| 2012/0317194 | A1* | 12/2012 | Tian | H04W 8/005 709/204 |
| 2013/0049954 | A1* | 2/2013 | Scannell | H04W 68/00 340/539.11 |
| 2013/0052946 | A1* | 2/2013 | Chatterjee | H04W 4/80 455/41.1 |
| 2013/0227114 | A1* | 8/2013 | Vasseur | H04L 41/044 709/224 |
| 2014/0045482 | A1* | 2/2014 | Bisson | H04W 4/021 455/420 |
| 2014/0057563 | A1* | 2/2014 | Salahshoor | H04W 84/20 455/41.2 |
| 2014/0064258 | A1* | 3/2014 | Montag | H04W 84/12 370/338 |
| 2014/0073300 | A1* | 3/2014 | Leeder | H04B 5/0031 455/416 |
| 2014/0074921 | A1* | 3/2014 | Poornachandran | G06Q 10/109 709/204 |
| 2014/0120905 | A1* | 5/2014 | Kim | H04W 12/06 455/426.1 |
| 2014/0253813 | A1* | 9/2014 | Bakar | H04B 14/00 348/734 |
| 2015/0002291 | A1 | 1/2015 | Kizuki | |
| 2015/0213703 | A1* | 7/2015 | Filson | H04L 12/1895 340/517 |

FOREIGN PATENT DOCUMENTS

| | | | |
|---|---|---|---|
| WO | 2004081713 A2 | 9/2004 | |
| WO | WO-2004081713 A2 * | 9/2004 | ......... H04L 12/2803 |
| WO | 2011079877 A1 | 7/2011 | |
| WO | 2011095567 A1 | 8/2011 | |
| WO | WO-2011095567 A1 * | 8/2011 | ......... H04L 12/2827 |

OTHER PUBLICATIONS

Malik Sikandar Hayat Khiyal, Aihab Khan, and Erum Shehzadi (SMS Based Wireless Home Appliance Control System (HACS) for Automating Appliances and Security, Informing Science and Information Technology, vol. 6, 2009)). (Year: 2009).*

Latvakoski J., Pääkkönen, P., Pakkala, D., Tikkala, A. Rennes, J., Välitalo, P. VTT Electronics (Interaction of All IP Mobile Internet Devices with Networked Appliances in a Residential Home, IEEE, 2002). (Year: 2002).*

Andreas Kamilaris and Andreas Pitsillides (Social Networking of the Smart Home, IEEE, 2010). (Year: 2010).*

(56) References Cited

OTHER PUBLICATIONS

Jens H. Jahnke, Marc D'entremont, and Jochen Stier (Facilitating the Programming of the Smart Home, IEEE Wireless Communications, Dec. 2002) (Year: 2002).*
Khusvinder Gill, Shuang-Hua Yang, Fang Yao, and Xin Lu (A ZigBee-Based Home Automation System, IEEE Transactions on Consumer Electronics, vol. 55, No. 2, May 2009). (Year: 2009).*
Guo B., et al., "From the internet of things to embedded intelligence," 2012, pp. 1-29) . (Year: 2012).*
21. Wenlong Yue, Yuanyuan Zhang, Zhenquan Qin, Ming Zhu, Cheng Jin, Lei Wang, Lei Shu, Canfeng Chen et al., (Gatewaying the Wireless Sensor Networks, 2013 IEEE 9th International Conference on Mobile Ad-hoc and Sensor Networks) (Year: 2013).*
20. Sheng et al., "A Survey on the IETF Protocol Suite for the Internet of Things: Standards, Challenges, and Opportunities", 2013) (Year: 2013).*
Chavez et al, "SAMoA: An Experimental Platform for Situation-Aware Mobile Assistance", Proceedings of Workshop on Interactive Application of Mobile Computing (IMC), 1998, p. 1-6.

* cited by examiner

METHOD OF NOTIFYING A USER ON A TASK OF AN APPARATUS

CROSS-REFERENCE TO PRIOR APPLICATIONS

This application is the U.S. National Phase application under 35 U.S.C. § 371 of International Application No. PCT/EP2014/072930, filed on Oct. 27, 2014, which claims the benefit of European Patent Application No. EP13191376.6, filed on Nov. 4, 2013. These applications are hereby incorporated by reference herein.

FIELD OF THE INVENTION

The invention relates to the field of communication networks and more specifically to the use of such networks to notify a user of an apparatus after the user has been interacting with the apparatus.

BACKGROUND OF THE INVENTION

Ovens, washing machines, bread makers and similar appliances take some time to do their job. But, user action is preferred shortly after these appliances are finished, to avoid burned food, wrinkled clothing, or hard bread for example. These devices are typically equipped with an alert function to signal the user when they are done. However, if you are not in the same room at the moment the audio alert goes off you can easily miss it. For this reason several people have thought of having appliances send push notifications to a mobile device. An example of such an appliance is a washing machine sending a notification via a wireless LAN network to a mobile device once the washing machine has completed its task. In this method, the number of the mobile phone needs to be entered upfront into a processor of the washing machine.

Publication WO2011/095567 describes a system wherein a notification is sent by an appliance to a set-top box. Several different users may be notified when looking at the television. However, once they leave the room, they will fail to see or hear any notification of the connected television.

SUMMARY OF THE INVENTION

It is an object of the invention to provide a system that is more flexible than the systems known from the prior art.

For this purpose, according to a first aspect of the invention, a notifying system for notifying a user is provided. The system comprises an apparatus arranged to perform a task. The apparatus may for example be a kitchen appliance such as an oven, where its task is heating food. The apparatus may also be a ticket machine of a public transport service.

The system further comprises a mobile notifying device for notifying the user about a task of the apparatus. The apparatus may be arranged to automatically detect the mobile notifying device if the mobile notifying device is in the vicinity of the apparatus once the task is initiated by a user, and to associate the task with the mobile notifying device. The apparatus and notifying device are arranged to communicate a notification message via a wireless communication network. This notification message comprises information related to the task, such as a message telling the user that the food is cooked.

By automatically detecting the mobile notifying device, the apparatus is able to send a message to a person which has (most probably) initiated the task. It is assumed in this invention that the initiator needs to be notified, which is true in most situations. The advantage of the invention is that a user will be notified automatically without giving any instructions to the apparatus. She just has to initiate e.g. an oven, and wear a mobile phone arranged to receive notifying messages from the apparatus. There is no need to monitor the apparatus. The user is allowed to move freely in the knowledge that she will be notified In an embodiment, the wireless communication network is a WLAN or a cellular network. These networks are very suitable to send a notifying message to a user who left the vicinity of the apparatus and wants to be informed about the task when she is at some other place, such as in another room, or outside, or on her way.

According to a second aspect of the invention, there is provided an apparatus for performing a task. The apparatus is arranged to automatically detect the mobile notifying device if the mobile notifying device is in the vicinity of the apparatus once the task is initiated by a user. The apparatus will associate the task with the mobile notifying device, and communicate a notification message to the mobile notifying device via a wireless communication network, the notification message comprising information related to the task.

In an embodiment, the apparatus is arranged to detect the mobile notifying device by way of sending out an ID request using short range wireless communication technology, such as Bluetooth, and by receiving an ID from the mobile notifying device.

In an embodiment, the apparatus is arranged to detect the mobile notifying device using a body-coupled communication technique, such as ADA (Active Digital Aura) communication. For this purpose the apparatus may have an ADA communicator arranged to receive and send signals via the hand touching the apparatus when the task of the apparatus is initiated. An initiator of the task may wear a watch or other wearable arranged to communicate via ADA. In this way the initiator is notified by the apparatus because she touched the apparatus, which is very convenient since no other action were needed to start the notifying service.

In an embodiment, the apparatus comprises a short range communicator arranged to communicate only within a range less than 4 meter, or preferably within a range less than 1 meter. These ranges are very suitable for detecting the correct person in the vicinity of the apparatus, being the initiator of the task. For example, if a person starts an oven, she will be within 1 meter of the apparatus, and (most probably) the only person within that range. Ranges of less than 4 meters, such as 3 meter, may be useful in situations where the apparatus may have facilities to give instruction in an oral manner, i.e. spoken instructions. Larger ranges are possible of course.

In an embodiment, the apparatus comprises a kitchen appliance, such as an oven or a washing machine. Such kitchen appliances often need attention, so it is very useful for such applications to have the facility described above.

In a further embodiment, the apparatus comprises a public transport user interaction terminal. A user will interact with such an apparatus e.g. to buy a ticket before traveling by bus, train, boat or airplane. So as soon as the user buys a ticket at a ticket machine, or checks in at the airport, his portable device will automatically subscribe to notifications for travel plan changes, delays, departures, etc. There is no need for the traveler to actively subscribe for such notifying service as it will all be performed without the traveler knowing it until he gets a notification.

According to a third aspect of the invention, there is provided a mobile notifying device for notifying a user. The device is arranged to communicate an ID to an apparatus using a short range communication technique, a WLAN, a cellular network, or a body-coupled communication technique. The device will then receive a notifying message from the apparatus, and will notify the user by presenting the notifying message to the user.

In an embodiment, the mobile notifying device may be a mobile phone, watch, bracelet, necklace, glasses, ring, or smart textile. All these mobile device and wearables can be arranged as a mobile notifying apparatus as described above and easily carried by the user.

The mobile notifying device may comprise a user input module for receiving instructions from the user, and a processor arranged to receive rerouting instructions from the user via the user input indicating that the notifying messages needs to be sent to another notifying device. The processor will then send a rerouting message to the apparatus by means of a wireless network. Alternatively the rerouting message may be sent to a server handling the routing of the notifying messages. In this way, the initiator of the task is able to let the notifications be sent to another person by entering a command into the mobile notifying apparatus.

According to a further aspect of the invention, there is provided a method of notifying a user on a task of an apparatus. This method comprises automatically detecting a mobile notifying device if the mobile notifying device is in the vicinity of the apparatus once the task is initiated by a user. And then associating the task with the mobile notifying device, and communicating a notification message to the mobile notifying device via a wireless communication network, the notification message comprising information related to the task.

According to a further aspect of the invention, there is provided a method of notifying a user of a mobile notifying device on a task of an apparatus. The method comprises communicating an ID to an apparatus using a short range communication technique, a WLAN, a cellular network, or a body-coupled communication technique. And then receiving a notifying message from the apparatus, and notifying the user by presenting the notifying message to the user.

According to a further aspect of the invention, there is provided a computer program product enabling a processor to carry out one of the methods as described above.

According to yet a further aspect of the invention there is provided a data carrier comprising a computer program product as described above.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
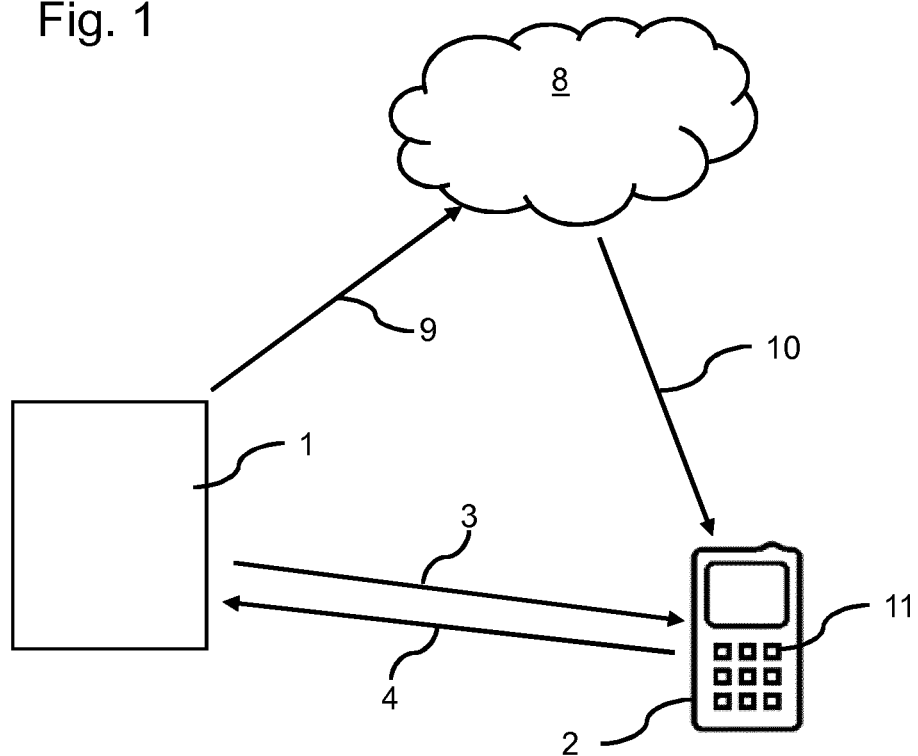
FIG. 1 shows a notifying system for notifying a user, according to an embodiment.

FIG. 1 shows a notifying system for notifying a user, according to an embodiment. The system comprises an apparatus 1 arranged to perform a task. In an embodiment, the apparatus is a kitchen appliance. The apparatus 1 may be a washing machine having the task of cleaning laundry. It may be any other kitchen appliance such as an oven or a cooker. In a further embodiment, the apparatus 1 may be a terminal for a public transport system. The terminal may reside in a bus to register a traveler, or it may also be a terminal at a bus stop or airport, where a traveler is checking in. In the case where the apparatus 1 is a terminal of a transport system, it may be in communication with a server (not shown in FIG. 1) arranged to administrate travelers and other travel information, such as bus departure times, or flight schedules.

The system in FIG. 1 also comprises a mobile notifying device 2 for notifying a user about a task of the apparatus 1. The apparatus 1 and mobile notifying device 2 are arranged to communicate an ID of the mobile notifying device 2 by means of a short range wireless communication technology, such as Bluetooth, Zigbee, ANT, wide beam Infra-Red, NFC (Near Field Communication), Ultra sound communication, or any other short range communication technique. Alternatively, communication can be achieved using a body coupled communication technology, such as ADA (active digital aura).

In FIG. 1, the arrow 3 indicates an ID request sent by the apparatus 1 to the mobile device 2. The mobile notifying device 2 will as a response to receiving the request, return an ID of the mobile device, see arrow 4. The apparatus 1 may comprise a memory (not shown) for storing the ID which may be for example an IP address, telephone number, e-mail address, or twitter account, of the mobile notifying device 2.

The apparatus 1 is arranged to communicate a notification message via a wireless communication network 8 to the mobile notifying device 2, see arrows 9, 10. The wireless communication network 8 may be a cellular communication network or a WLAN (Wide Local Area Network) network or any other type of wireless communication network able to communicate over a relatively long distance. The notification message comprises information related to the task performed the apparatus 1. In the example of the washing machine, the notification message may indicate that a washing cycle has been completed. The user will then be able to timely remove the laundry from the washing machine in order to avoid wrinkled cloths or other unwanted laundry conditions.

In order to send the notification message(s) to the correct mobile notifying device, the apparatus 1 may be arranged to only store one mobile device ID at a time. In other words, only one mobile notifying device may be subscribed to the notifying service of the apparatus 1. Once a task has ended, the apparatus will end the associated subscription by removing the stored mobile device ID from memory or by setting a flag indicating that no subscription is active. A stored active ID may be overwritten by another ID as soon as another new mobile notifying device has communicated its ID to the apparatus 1. Alternatively, the apparatus 1 may be arranged to store more than one ID, in which case, the apparatus 1 is able to send notifications to multiple mobile notifying devices 2 having a subscription for a task performed by the apparatus 1.

It is noted that the ID request and the corresponding answer do not necessarily need to go via the same communication technology. For example an embodiment is possible wherein a video camera in glasses, such as Google Glass, recognizes the appliance via computer vision in combination with a QR code or bar code that represents the address of the appliance. In response the glasses then submits its ID to the names address, the appliance at that moment waiting to receive it. In yet another embodiment the notifying device detects entering a confined zone around the appliance, for example via local coded light integrated in the kitchen lighting (with the appliance address). In yet another embodiment the confined zone is detected via indoor localization technology, such as Wi-Fi triangulation—in this case the appliance should publish its confined zone to the notifying device somehow (e.g., via a server on Wi-Fi), and an app on the notifying device should disclose its ID to the appliance when it enters the confined zone.

Figure 2:
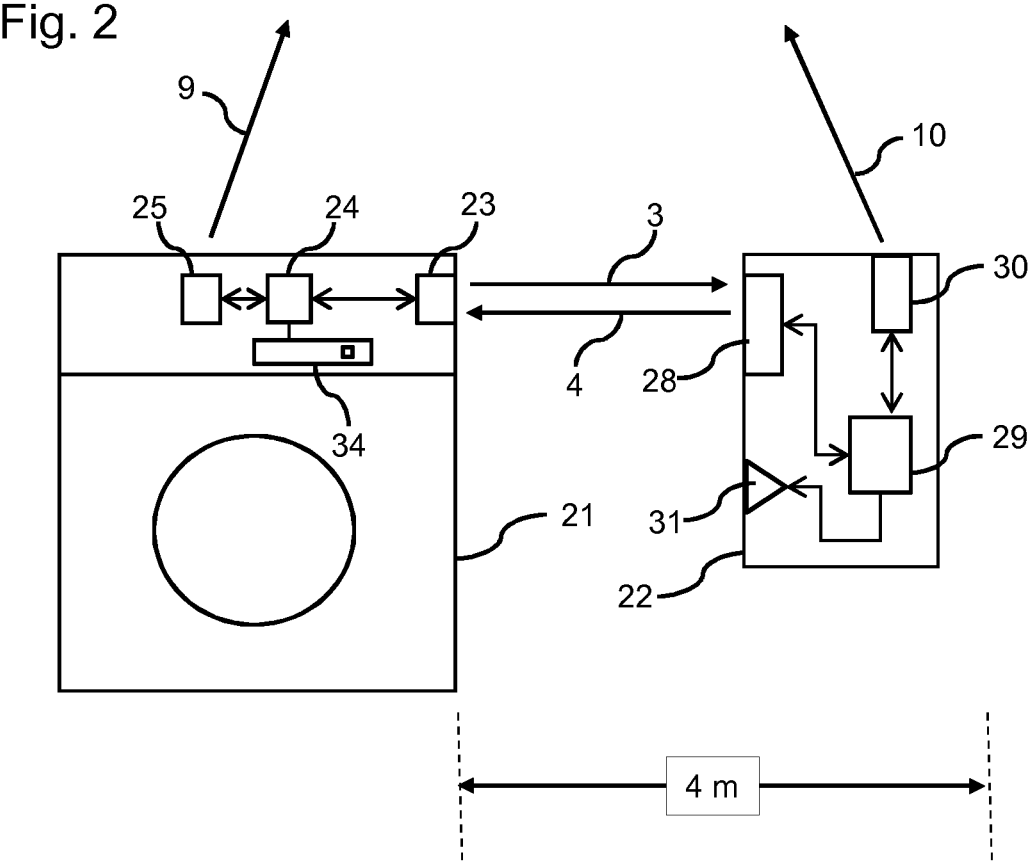
FIG. 2 shows an example of a washing machine and a mobile notifying device according to an embodiment.

As mentioned above, the apparatus may be a washing machine. FIG. 2 shows an example of a washing machine 21 and a mobile notifying device 22 according to an embodiment. The washing machine 1 comprises a short range communicator 23 and a processor 24 and a long range communicator 25. The processor 24 of the washing machine 21 is operably coupled to both the short range communicator 23 and the long range communicator 25. The mobile notifying device 22 comprises in this example a short range communicator 28, a processor 29 and long range communicator 30. The processor 29 of the mobile notifying device 22 is operably coupled to both the short range communicator 28 and the long range communicator 30. Furthermore the mobile notifying device 22 comprises a loudspeaker 31 controlled by the processor 29 for notifying the user by means of sound messages or signals. It is noted that all kinds of other types of user output modules may be used to notify the user, such as a vibrating module or a display for showing messages.

As is shown in FIG. 2, the washing machine 21 may also comprise a user interface 34 for receiving instruction from the user. The user may set the temperature and/or a washing program. Next he may press a start button to start the washing. The pressing of the start button may trigger the processor 24 to send an ID request to a user in the proximity of the washing machine using a short range communication technology such as Bluetooth. In an embodiment, a person within 1 meter is supposed to be the person in charge of the washing machine 21. The ID request will be received by the mobile notifying device 22 carried by the user. The mobile notifying device 22 will respond by sending its ID back to the washing machine 21 using the same short range technology. Once the washing machine 21 has received the ID of the mobile notifying device 22, it will be able to track the user under the assumption that the user will carry the mobile notifying device 22 with him when leaving the washing machine 21.

The washing machine 21 may comprise a follow-me button (not shown) that can be pressed by the user if he wants to receive notifications from the washing machine 21. In this case, the user is actively asking notifications whereas in the previous embodiments the user will be automatically notified if action is needed or if the washing machine 21 is ready.

Now an example is given, where a user is using an oven to cook a meal. In this example, the oven is the apparatus having a task, i.e. heating a meal. When a user carrying or wearing a suitable notifying device, sets the oven to cook a meal for e.g. 90 minutes, he automatically subscribes to being notified by the oven when the meal is ready. During, or immediately after setting or programming the oven, the oven initiates a connection to the user's mobile notifying device via a short range networking system such as for example Bluetooth, body-coupled communication, ANT, or Zigbee. Note that the range of this networking system may be tuned such that only a mobile notifying device such as a mobile phone, smart watch, or smart glasses of the user operating the appliance is connected to and subscribed to the notification service. For a smart watch, if worn on the wrist of the hand that interacts with the appliance, a range of 0.5 m could be enough—other devices such as smart phones or glasses may require a larger range, e.g. 1.5 m.

During the cooking the user will receive a push notification on his mobile device if any action is needed from his side (e.g., stirring or turning the food), or if anything goes wrong, with finally the notification that the meal is ready. At that moment also the user's notification subscription ends and he will not receive any future notifications unless he subscribes again.

Figure 3:
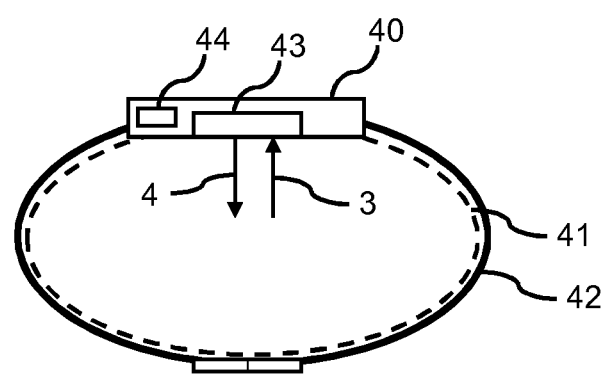
FIG. 3 shows a further embodiment of the mobile notifying device where the mobile notifying device is a smart watch.

FIG. 3 shows a further embodiment of the mobile notifying device where the mobile notifying device is a smart watch 40 attachable to a wrist 41 of a user (see dashed line) by a watch strap 42. In this example the smart watch 40 comprises an active digital aura (ADA) module 43 for sending and receiving signals via the body of the user, using a body-coupled technology. The smart watch 40 also comprises a long range communicator 44 arranged to communicate via WLAN or a cellular network. Via the long range communicator 44, the user may be notified by the apparatus 1.

In the embodiment of FIG. 3 to work properly, the apparatus 1 requesting the ID of the watch 40 needs to support body-coupled communication. To this end, the apparatus 1 may comprise a touch screen arranged to communicate with the ADA module 43 once the user touches the screen, or the apparatus 1 may comprise one or more buttons (not shown) that are arranged with ADA transceivers. The buttons may be the regular control buttons for operating the apparatus 1, or they may be separate buttons, such as a follow-me button, which the user can touch or press to indicate that he want be notified on future status changes of the apparatus 1. Since body-coupled communication techniques, such as ADA, would provide mobile device identification based on touch, the risk that the apparatus 1 will subscribe an incorrect ID will be very small.

The above described embodiments assure that a particular user that is using the appliance (i.e. apparatus) will not miss any notification from the appliance for which his action is needed. But also, assuming no local alarm is generated, other users will not be disturbed by alarms that are not set by them, which can be valuable in households with many users, such as student homes, dormitories, etc. On top of this, some interesting features can be enabled this way. The appliance could send (on-demand) updates on the estimated time of finishing, so the user can check on his mobile device how long the appliance still needs before finishing. He does not need to walk over to the appliance to check this.

In an embodiment, if the subscribed user needs to leave the home, or for any other reason cannot take care of the running appliance anymore, then he can pass on the notification subscription to another user in the house to take over the responsibility to take care of the appliance in due time. This could for example be done by a specific app that enables this hand over between users. If the user leaves the home with still a subscription running—this could be detected via GPS, disconnect from the Wi-Fi home network, or by any other means—then the user could get a warning that there is still an appliance running which he subscribed to. He can then hand over the subscription to another user in the home, either manually or via automatic delegation, or make sure he is back in time before the appliance will be finished. Complementary to this, or as an alternative, the notifying system may also automatically notify other users upon detection that the primary user is no longer within operation range of the appliance, with an option to take over the subscription. If someone takes over, then the other users will also be notified.

The system may present the initial notification only on the associated mobile device, e.g. not to disturb other users in the house. However, if the user does not respond within a specific time, or after a specific amount of initial notifications on the mobile notifying device 2, the appliance itself may also present notifications so as to notify other people around. Possibly these notifications could also be sent to all devices that are currently present on the Wi-Fi home network.

It is noted that, depending on range and nearby users, the apparatus 1 may identify other users next to the user operating the appliance. In that case a selection and confirmation facility may be executed such that the apparatus 1 connects to the right mobile notifying device, such as known today from Bluetooth connection protocols. Alternatively, if multiple mobile devices are detected by apparatus 1, the mobile device that has the strongest close range wireless connection (assumed to be the closest in range) may be selected automatically to receive the ID request. Note that this issue is less likely to occur when body-coupled communication is used.

As an alternative to automatic association of the nearby wearable or mobile notifying device, users might also manually associate their device, e.g., by holding their mobile device close to the appliance for an NFC-enabled association and subsequent subscription to the notification service of the appliance.

The above described embodiments can be applied to any appliance that could provide a meaningful notification subscription service to users' devices: alarm clocks, ovens, cooking plates, meal makers, bread makers, fryers, washing and drying machines, dish washers, water cookers, coffee makers, and so on. Besides the consumer area one can think also of professional appliances, which could extend the previous examples to machines with a certain process time used by multiple users in any industry, such as perhaps bakeries, manufacturing lines and process industries. On the receiving part any device capable of rendering notifications to users could be used such as smart watches, mobile (smart) phones, and tablets, but also any future wearable electronics such as glasses, bracelets, rings, and smart textiles, etc.

In a further embodiment, the apparatus 1 is part of a public transport user control system. The apparatus may be a terminal 51, see FIG. 4, with which the user interacts before traveling by bus, train, boat or airplane. As soon as the user buys a ticket at a ticket machine, or checks in at the airport, his portable device may automatically subscribe to notifications for travel plan changes, delays, departures, etc. When his journey has ended the connection to the notification service may be automatically ended. This will be explained by way of example with reference to FIG. 4.

Figure 4:
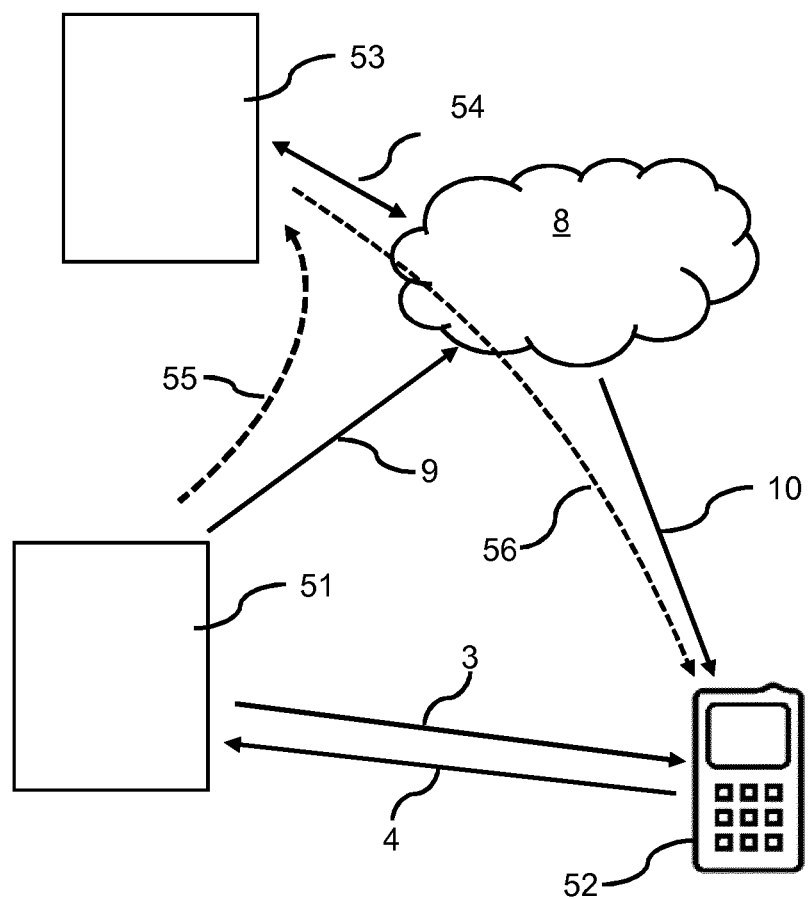
FIG. 4 schematically shows a notifying system for notifying a user according to an embodiment.

FIG. 4 schematically shows a notifying system for notifying a user according to an embodiment. The system comprises a terminal 51, such as a ticket machine, arranged to perform a task, i.e. supplying a flight ticket. The terminal 51 will also register the user to a server associated with the terminal 51. The server may be arranged to provide flight time information to the user. The moment, the user receives his ticket from the ticket machine 51, his mobile phone, or any other mobile notifying device, may receive an ID request from the terminal 51, see arrow 3, and send its ID back to the terminal, see arrow 4, using a short range communication technology. The terminal 51 is arranged to communicate with a server 53 via a cellular communication network 8, see arrow 9 and 54. The terminal 51 may alternatively communicate with the server 53 via another network, see arrow 55, such as an airport computer network or via the Internet (not shown). Once the ID of the mobile phone 52 is registered at the terminal 51, the terminal may forward the ID towards the server 53. The server may be arranged to administrate the ID and travel information related to the ID. If the server 53 is notified of a relevant change of e.g. the flight time, it may send a notification to the mobile phone 52 of the user via the cellular network 8, see arrow 56. So in this way the traveler is automatically notified, possibly even without knowing he was subscribed to the notifying service. To avoid sending unwanted future notifications to the traveler, the server 53 may be arranged to only send certain notifications to the mobile phone 52 until the last plane in the travel plan has commenced its take off, or until the moment the traveler passes the last gate.

Figure 5:
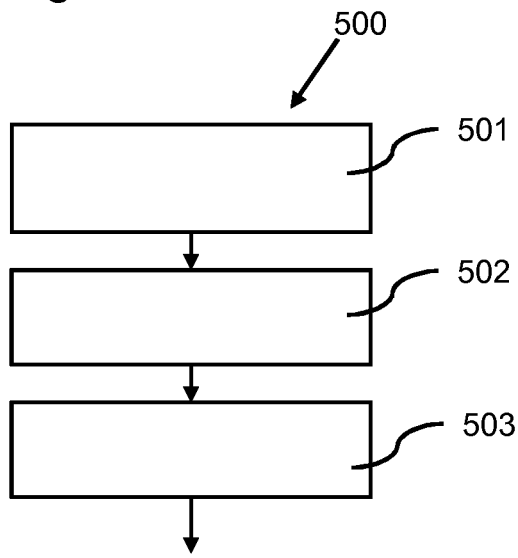
FIG. 5 shows a flow chart of a method according to an embodiment of an aspect of the invention.

FIG. 5 shows a flow chart of a method 500 according to an embodiment of an aspect of the invention. The method 500 may be executed by the mobile notifying device, such as the mobile phone 22 shown in FIG. 2, and more specifically by the processor 29. The method 500 of notifying a user of a mobile notifying device 2; 22; 40 about a task of an apparatus starts with, see block 501, communicating an ID to an apparatus 1 using a short range communication technique, a WLAN, a cellular network, or a body-coupled communication technique. Next a notifying message is received from the apparatus 1, see block 502. Then in a block 503 the user is notified by presenting the notifying message to the user.

Figure 6:
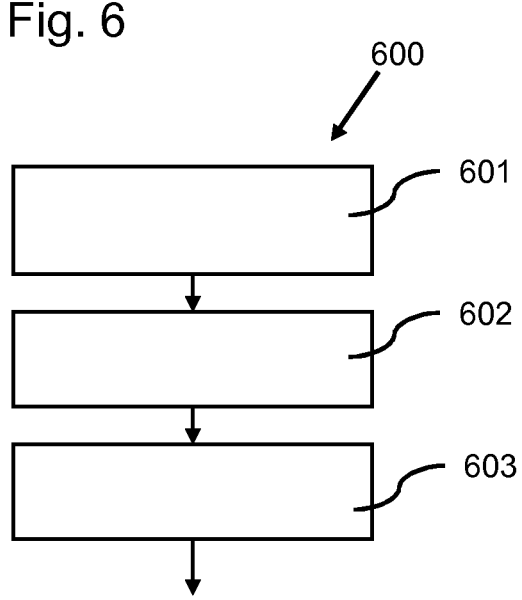
FIG. 6 shows a flow chart of a further method according to an embodiment of an aspect of the invention.

FIG. 6 shows a flow chart of a method 600 according to an embodiment of an aspect of the invention. The method 600 may be executed by the apparatus 1, such as the washing machine shown in FIG. 2, and more specifically by the processor 24. The method 600 of notifying a user about a task of an apparatus starts with, see block 601, automatically detecting a mobile notifying device 2; 22; 40 if the mobile notifying device is in the vicinity of said apparatus once said task is initiated by a user. Then in a block 602 the method continues with associating the task with the mobile notifying device. Once the associating is done the apparatus may communicate a notification message to the mobile notifying device 1 via a wireless communication network, comprising information related to said task, see block 603.

Figure 7:
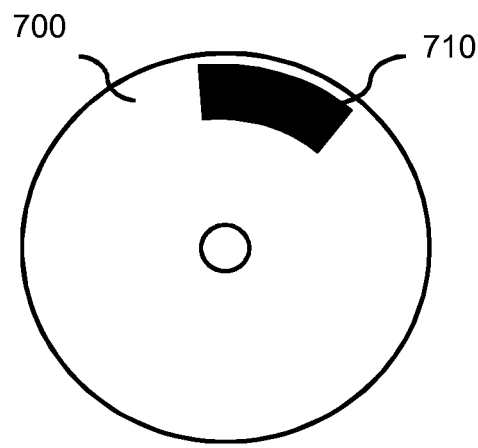
FIG. 7 schematically shows an example of a data carrier according to a further aspect of the invention.

FIG. 7 schematically shown an example of a further aspect of the invention, which relates to a data carrier 700 comprising a computer program product 710 enabling the a processor of the mobile notifying device 2; 22; 40; 52 to carry out the method of FIG. 5.

Figure 8:
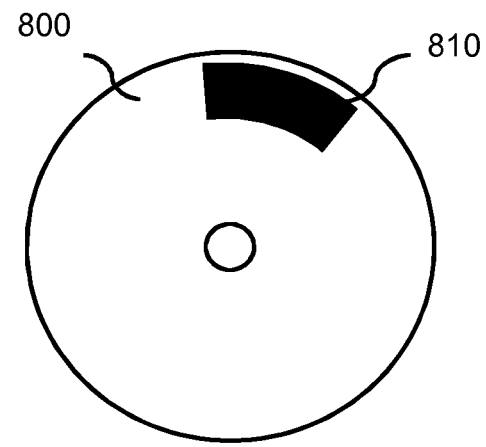
FIG. 8 schematically shows an example of a data carrier according to a further aspect of the invention.

FIG. 8 schematically shown an example of a further aspect of the invention, which relates to a data carrier 800 comprising a computer program product 810 enabling the processor of the apparatus 1; 21; 51 to carry out the method of FIG. 6. Although depicted as an optical disc, other data carriers are also envisaged, more particularly data carriers that provide non-volatile storage device as known to those skilled in the art of data storage, such as e.g. flash drives and portable hard disk drives.

In an embodiment of the invention, the mobile notifying device 2 may comprise a user input module, such as the input keys 11 shown in FIG. 1, for receiving instructions from the user, where the processor of the mobile notifying device may be arranged to receive forwarding instructions from the user via the user input 11 indicating that another user needs to be notified. The processor may then send a rerouting message to the apparatus 1; 21; 51 or to the server 53 of FIG. 4, by means of the long range communicator 30, see also FIG. 2. It should be clear that all sorts of known input modules could be present in or on the mobile notifying device 2 such as a touch screen or specific command buttons or keys. The user may alternatively enter forward instructions by way of speech.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. An apparatus, comprising:
a user interface, wherein the user interface is configured to receive an input from a user, wherein the input requests an initiation of a task by the apparatus, wherein the apparatus is configured to perform the task;
a first wireless communication device, wherein the first wireless communication device is configured to detect, in response to receiving from the user interface said input which requests the initiation of the task by the apparatus, one or more mobile notifying devices which are within a vicinity of the apparatus; and
a processor circuit, wherein the processor circuit is configured to:
subscribe one of said one or more detected mobile notifying devices as a subscribed mobile notifying device, wherein:
in a case where the one or more detected mobile notifying devices includes only one mobile notifying device, the processor circuit subscribes the one mobile notifying device as the subscribed mobile notifying device, and
in a case where the one or more detected mobile notifying devices comprises a plurality of mobile notifying devices, the first wireless communication device receives a corresponding signal from each of the plurality of mobile notifying devices and the processor circuit is configured to select as the subscribed mobile notifying device one of the plurality of mobile notifying devices from which a strongest signal is received by the first wireless communication device, and
associate said task with said subscribed mobile notifying device; and
a second wireless communication device, wherein the second wireless communication device is configured to communicate a notification message to said subscribed mobile notifying device via a wireless communication network, wherein said notification message includes information related to said task.

2. The apparatus of claim 1, wherein said detection comprises:
sending an ID request via the first wireless communication device using short range wireless communication technology; and
receiving an ID from at least one of said one or more mobile notifying devices via the first wireless communication device using the short range wireless communication technology.

3. The apparatus of claim 1, wherein said first wireless communication device is configured to:
communicate only within a range of less than 4 meters.

4. The apparatus of claim 1, wherein said apparatus is configured to:
detect said detected mobile notifying device using a body-coupled communication technology.

5. The apparatus of claim 1, wherein said apparatus comprises a kitchen appliance.

6. The apparatus of claim 1, wherein said apparatus comprises a public transport user interaction terminal.

7. The apparatus of claim 1, wherein the second wireless communication device is configured to communicate the notification message to said subscribed mobile notifying device via the wireless communication network to alert the user that the apparatus has completed the task which the user initiated via the user interface.

8. A notifying system for notifying a user, said system comprising:
an apparatus arranged to perform a task; and
a mobile notifying device, wherein the mobile notifying device is configured to notify said user about said task, wherein said apparatus includes:
a user interface, wherein the user interface is configured to receive an input from the user regarding initiating said task by the apparatus;
a first wireless communication device, wherein the first wireless communication device is configured to detect, in response to receiving from the user interface said input which requests the initiation of the task by the apparatus, one or more mobile notifying devices which are within a vicinity of the apparatus;
a processor circuit, wherein the processor circuit is configured to:
subscribe one of said one or more detected mobile notifying devices as a subscribed mobile notifying device, wherein:
in a case where the one or more detected mobile notifying devices includes only one mobile notifying device, the processor circuit subscribes the one mobile notifying device as the subscribed mobile notifying device, and
in a case where the one or more detected mobile notifying devices comprises a plurality of mobile notifying devices, the first wireless communication device receives a corresponding signal from each of the plurality of mobile notifying devices and the processor circuit is configured to select as the subscribed mobile notifying device one of the plurality of mobile notifying devices from which a strongest signal is received by the first wireless communication device, and
associate said task with said subscribed mobile notifying device; and
a second wireless communication device, wherein the second wireless communication device is configured to communicate a notification message via a wireless communication network to the subscribed mobile notifying device, wherein the notification message includes information related to the task.

9. The notifying system of claim 8, wherein said wireless communication network is one of: a wireless local area network and a cellular network.

10. The notifying system of claim 8, wherein the second wireless communication device is configured to communicate the notification message to said subscribed mobile notifying device via the wireless communication network to alert the user that the apparatus has completed the task which the user initiated via the user interface.

11. A mobile notifying device for notifying a user, comprising:
a first wireless communication device, wherein the first wireless communication device is configured to communicate an ID to an apparatus which is configured to perform a task, wherein the first wireless communication device is configured to communicate the ID using a short range communication technique, wherein the short range communication technique employs at least one of: Bluetooth, Zigbee, Adaptive Network Topology (ANT), wide beam Infra-Red, Near Field Communication (NFC), ultrasound communication, and a body-coupled communication technology; and
a second wireless communication device, wherein the second wireless communication device is configured to receive, in response to the first wireless communication device communicating the ID, a notifying message from said apparatus via a wireless communication network, wherein the notifying message pertains to the task, and wherein the wireless communication network comprises at least one of a cellular network and a wide local area network (WLAN),
wherein the mobile notifying device is configured to notify said user by presenting said notifying message to said user.

12. The mobile notifying device of claim 11, wherein said mobile notifying device is one of: a mobile phone, a watch, a bracelet, a necklace, a glasses, a ring, and a smart textile.

13. The mobile notifying device of claim 11, wherein said mobile notifying device comprises:
a user input module configured to receive instructions from said user, and
a processor circuit configured to:
receive rerouting instructions from said user via said user input module indicating that said notifying message is to be sent to another wireless notifying device, and
send a rerouting message to said apparatus by means of the second wireless communication device.

14. The mobile notifying device of claim 11, wherein the second wireless communication device is configured to receive the notifying message from said apparatus via the wireless communication network indicating that the task is completed, and wherein the mobile notifying device further includes a user interface which is configured to alert the user, in response to the received notifying message, that the task is completed.

15. A method, comprising:
an apparatus receiving an input from a user, wherein the input requests an initiation of a task by the apparatus;
in response to receiving from the user said input which requests the initiation of the task by the apparatus, the apparatus detecting, via a first wireless communication device, one or more mobile notifying devices which are within a vicinity of said apparatus;
subscribing one of said one or more detected mobile notifying devices as a subscribed mobile notifying device, wherein:
in a case where the one or more detected mobile notifying devices includes only one mobile notifying device, the one mobile notifying device is subscribed as the subscribed mobile notifying device, and
in a case where the one or more detected mobile notifying devices comprises a plurality of mobile notifying devices, the first wireless communication device receives a corresponding signal from each of the plurality of mobile notifying devices and one of the plurality of mobile notifying devices from which a strongest signal is received by the first wireless communication device is selected as the subscribed mobile notifying device;
associating said task with the subscribed mobile notifying device; and
communicating a notification message to said subscribed mobile notifying device via a second wireless communication device and a wireless communication network, wherein said notification message includes information related to said task.

16. The method of claim 15, comprising:
the apparatus receiving an ID for at least one of the one or more mobile notifying devices, using a short range communication technique, wherein the short range communication technique employs at least one of: Bluetooth, Zigbee, Adaptive Network Topology (ANT), wide beam Infra-Red, Near Field Communication (NFC), ultrasound communication, and a body-coupled communication technique; and
the apparatus storing a record of the task together with the ID of the at least one mobile notifying device.

17. The method of claim 15, further comprising:
the apparatus detecting when the apparatus has completed the task which the user initiated via the user interface; and
the apparatus communicating the notification message to said subscribed mobile notifying device via the second wireless communication device and the wireless communication network, indicating that the task which the user initiated via the user interface is complete.

18. A tangible non-transitory computer readable medium having stored thereon a computer program product which, when accessed by a processor circuit, enables the processor circuit to control an apparatus to:
receive an input from a user, wherein the input requests an initiation of a task by the apparatus;
in response to receiving from the user said input which requests the initiation of the task by the apparatus, detect via a first wireless communication device one or more mobile notifying devices which are within a vicinity of said apparatus;
subscribe one of said one or more detected mobile notifying devices as a subscribed mobile notifying device, wherein:
in a case where the one or more detected mobile notifying devices includes only one mobile notifying device, the one mobile notifying device is selected as the subscribed mobile notifying device, and
in a case where the one or more detected mobile notifying devices comprises a plurality of mobile notifying devices, the first wireless communication device receives a corresponding signal from each of the plurality of mobile notifying devices, and one of the plurality of mobile notifying devices from which a strongest signal is received by the first wireless communication device is selected as the subscribed mobile notifying device;
associate said task with said subscribed mobile notifying device; and
communicate a notification message to said subscribed mobile notifying device via a second wireless communication device and a wireless communication network, wherein said notification message includes information related to said task.

19. The tangible non-transitory computer readable medium of claim 18, wherein the computer program product, when accessed by a processor circuit, enables the processor circuit to control the apparatus to further:
detect when the apparatus has completed the task which the user initiated via the user interface; and
communicate the notification message to said subscribed mobile notifying device via the second wireless communication device and the wireless communication network, indicating that the task which the user initiated via the user interface is complete.

* * * * *